(12) United States Patent
Zhao et al.

(10) Patent No.: US 12,484,025 B2
(45) Date of Patent: Nov. 25, 2025

(54) RESOURCE SELECTION METHOD, TERMINAL DEVICE, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, Victoria (AU); Yi Ding, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 339 days.

(21) Appl. No.: 17/813,113

(22) Filed: Jul. 18, 2022

(65) Prior Publication Data
US 2022/0361149 A1 Nov. 10, 2022

Related U.S. Application Data

(63) Continuation of application No. PCT/CN2020/074753, filed on Feb. 11, 2020.

(51) Int. Cl.
| | |
|---|---|
| H04L 1/08 | (2006.01) |
| H04W 72/02 | (2009.01) |
| H04W 72/04 | (2023.01) |
| H04W 72/0446 | (2023.01) |
| H04W 72/14 | (2009.01) |
| H04W 72/23 | (2023.01) |

(52) U.S. Cl.
CPC ............ *H04W 72/02* (2013.01); *H04L 1/08* (2013.01); *H04W 72/0446* (2013.01); *H04W 72/23* (2023.01)

(58) Field of Classification Search
CPC . H04W 72/02; H04W 72/0446; H04W 72/23; H04W 72/20; H04W 92/18; H04L 1/08
See application file for complete search history.

(56) References Cited

U.S. PATENT DOCUMENTS

| | | | | |
|---|---|---|---|---|
| 10,448,295 B2* | 10/2019 | Lee | ............ | H04W 4/70 |
| 11,419,128 B2* | 8/2022 | Wang | ............ | H04W 72/56 |
| 2018/0049084 A1* | 2/2018 | Lee | ............ | H04W 36/06 |

(Continued)

FOREIGN PATENT DOCUMENTS

| | | |
|---|---|---|
| CN | 104703224 A | 6/2015 |
| CN | 108632781 A | 10/2018 |

(Continued)

OTHER PUBLICATIONS

The First Office Action from corresponding Chinese Application No. 202211493647.3 dated Jun. 2, 2024. English translation attached.

(Continued)

*Primary Examiner* — Abdullahi E Salad
(74) *Attorney, Agent, or Firm* — Sheppard, Mullin, Richter & Hampton LLP

(57) ABSTRACT

The present disclosure provides a resource selection method. The method includes: selecting, by a first terminal device, a sidelink transmission resource based on a shared resource set in a resource selection or resource reselection process. The present disclosure also discloses a terminal device and a storage medium.

20 Claims, 3 Drawing Sheets

A first terminal device determines a shared resource set based on first indication signaling transmitted by a second terminal device to the first terminal device. — S100

The first terminal device selects a sidelink transmission resource based on the shared resource set in a resource selection or resource reselection process. — S101

(56) References Cited

U.S. PATENT DOCUMENTS

| | | | |
|---|---|---|---|
| 2019/0289615 A1* | 9/2019 | Lee | H04W 36/06 |
| 2019/0327753 A1* | 10/2019 | Lee | H04W 72/569 |
| 2019/0350045 A1 | 11/2019 | Lee et al. | |
| 2020/0092685 A1* | 3/2020 | Fehrenbach | H04W 84/005 |
| 2021/0266921 A1* | 8/2021 | Wang | H04B 17/318 |
| 2022/0123902 A1* | 4/2022 | Panteleev | H04L 1/1887 |
| 2022/0159624 A1* | 5/2022 | Ko | H04L 1/1812 |
| 2022/0312422 A1* | 9/2022 | Lee | H04W 72/53 |

FOREIGN PATENT DOCUMENTS

| | | |
|---|---|---|
| CN | 108633074 A | 10/2018 |
| CN | 110149698 A | 8/2019 |
| CN | 110167072 A | 8/2019 |
| CN | 110268780 A | 9/2019 |
| CN | 110392360 A | 10/2019 |
| CN | 110447294 A | 11/2019 |
| CN | 110622452 A | 12/2019 |
| CN | 110741710 A | 1/2020 |
| EP | 3508016 A1 | 7/2019 |
| EP | 3530047 A1 | 8/2019 |
| WO | 2018055813 A1 | 3/2018 |
| WO | 2019061422 A1 | 4/2019 |
| WO | 2020015345 A1 | 1/2020 |

OTHER PUBLICATIONS

3GPP, "3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985 V1.0.0, section5.2, Dec. 2, 2019.
International Search Report and Written Opinion dated Nov. 17, 2020 in International Application No. PCT/CN2020/074753. English translation attached.
Intel Corporation. "Summary for NR-V2X AI-7.2.4.1.4 Resource Allocation Mechanism", R1-1814260, 3GPP TSG RAN WG1 Meeting #95, Nov. 18, 2018 (Nov. 18, 2018), section 2.2.
Intel Corporation. "On Sensing Design Details for Sidelink V2V Communication", R1-162363, 3GPP TSG RAN WG1 Meeting #84bis, Apr. 1, 2016, the whole document.
Xiaomi Communications. "On Mode 2 resource allocation of V2x communications", R1-1909292, 3GPP TSG RAN WG1 #98, Aug. 16, 2019, the whole document.
Ericsson. "MAC Impact of UE Capability Limitation in TX Carrier Selection—Option 2", R2-1817945, 3GPP TSG-RAN WG2 #104, Nov. 2, 2018, the whole document.
Intel Corporation. "Summary#4 for AI 7.2.4.2.2 Mode-2 Resource Allocation", R1-1913569, 3GPP TSG RAN WG1 Meeting #99, Nov. 18, 2019, the whole document.
Communication pursuant to Article 94(3) EPC for European application 20919207.9 mailed Dec. 15, 2023.
Examination Report—Communication pursuant to Article 94(3) EPC dated Jul. 11, 2023 received in European Patent Application No. EP20919207.9.
First Examination Report (FER) dated Apr. 11, 2023 received in Indian Patent Application No. IN202227041428. English translation included.
"3rd Generation Partnership Project; Technical Specification Group Radio Access Network;Overall description of Radio Access Network (RAN) aspects for Vehicle-to-everything (V2X) based on LTE and NR(Release 16)", 3GPP Draft; RP-192876, 3rd Generation Partnership Project (3GPP), Mobile Competenc, Nov. 2019. 32 pages.
Extended European Search Report dated Nov. 11, 2022 received in European Patent Application No. EP20919207.9.
"3rd Generation Partnership Project; Technical Specification Group Radio Access Network; Overall description of Radio Access Network (RAN) aspects for Vehicle-to-everything (V2X) based on LTE and NR (Release 16)",3GPP Draft; RP-192876 , 3rd Generation Partnership Project (3GPP) , Mobile Competence Centre ; 650 , Route Des ; F-06921 Sophia-Ant Ipolis Cedex; France Dec. 2, 2019 (Dec. 2, 2019) , XP051834477.
The Second Office Action from corresponding Chinese Application No. 202211493647.3, dated Aug. 16, 2024.
The Grant Notice from corresponding Chinese Application No. 202211493647.3, dated Oct. 24, 2024.
Intel Corporation, "Design of Resource Allocation Mode-2 for NR V2X Sidelink Communication", 3GPP TSG RAN WG1 Meeting #99, R1-1912205, Nov. 18-22, 2019.
Huawei et al., "Mode 4 CA resource selection and power sharing for UE with limited TX capability", 3GPP TSG RAN WG1 Meeting #92, R1-1801424, Feb. 26-Mar. 2, 2018.

* cited by examiner

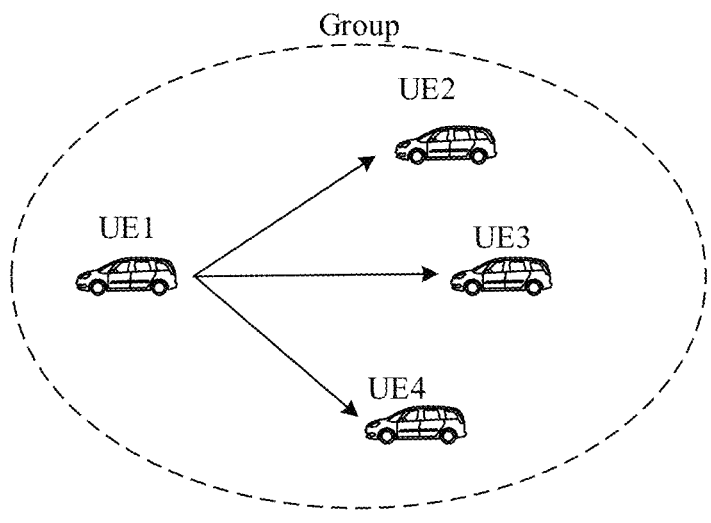
FIG. 4
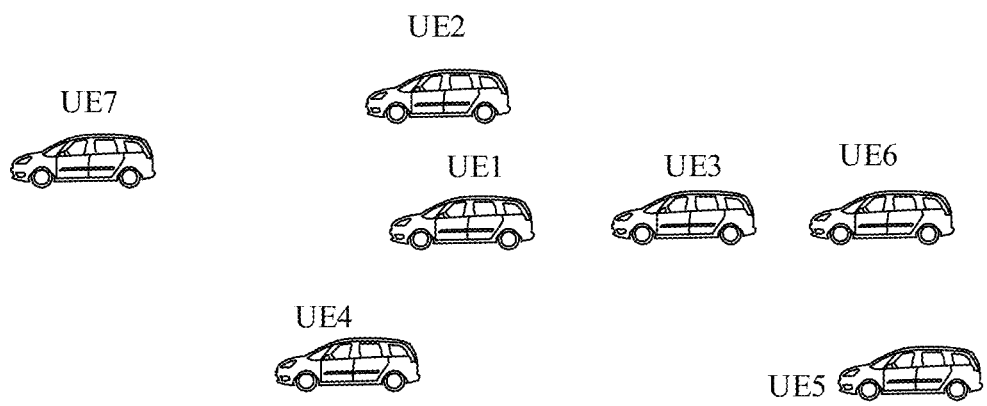
FIG. 5
| A first terminal device selects a sidelink transmission resource based on a shared resource set in a resource selection or resource reselection process. | S101 |
FIG. 6A

RESOURCE SELECTION METHOD, TERMINAL DEVICE, AND STORAGE MEDIUM

CROSS-REFERENCE TO RELATED APPLICATIONS

The present application is a continuation of International Application No. PCT/CN2020/074753 filed on Feb. 11, 2020, which is hereby incorporated by reference in its entirety.

TECHNICAL FIELD

The present disclosure relates to wireless communication technology, and more particularly, to a resource selection method, a terminal device, and a storage medium.

BACKGROUND

Device to Device (D2D) communication is based on SideLink (SL) transmission technology. Unlike the traditional cellular system in which communication data is received or transmitted via base stations, the Internet of Vehicles system adopts D2D communication (i.e., direct device-to-device communication) to achieve higher spectral efficiency and lower transmission delay. For D2D communication, there is no effective solution regarding how to improve the efficiency of sidelink resource selection or sidelink resource reselection in a process of sidelink resource selection or sidelink resource reselection by a terminal device.

SUMMARY

The embodiments of the present disclosure provide a resource selection method, a terminal device, and a storage medium, capable of improving the efficiency of sidelink resource selection or sidelink resource reselection.

In a first aspect, an embodiment of the present disclosure provides a resource selection method. The method includes: selecting, by a first terminal device, a sidelink transmission resource based on a shared resource set in a resource selection or resource reselection process.

In a second aspect, an embodiment of the present disclosure provides a first terminal device. The first terminal device includes: a processing unit configured to select a sidelink transmission resource based on a shared resource set in a resource selection or resource reselection process.

In a third aspect, an embodiment of the present disclosure provides a terminal device. The terminal device includes a processor and a memory for storing a computer program executable on the processor. The processor is configured to, when executing the computer program, perform the steps of the above resource selection method.

In a fourth aspect, an embodiment of the present disclosure provides a chip. The chip includes a processor configured to revoke and execute a computer program from a memory, to enable a device provided with the chip to perform the above resource selection method.

In a fifth aspect, an embodiment of the present disclosure provides a storage medium. The storage medium stores an executable program which, when executed by a processor, implements the above resource selection method.

In a sixth aspect, an embodiment of the present disclosure provides a computer program product. The computer program product includes computer program instructions that cause a computer to perform the above resource selection method.

In a seventh aspect, an embodiment of the present disclosure provides a computer program. The computer program causes a computer to perform the above resource selection method.

The resource selection method according to the embodiment of the present disclosure includes: selecting, by a first terminal device, a sidelink transmission resource based on a shared resource set in a resource selection or resource reselection process. In this way, in the process of resource selection or resource reselection, the first terminal device can select a transmission resource for data transmission based on a shared resource set transmitted by another terminal device, thereby improving the efficiency in sidelink resource selection or sidelink resource reselection.

BRIEF DESCRIPTION OF DRAWINGS

FIG. 4 is a schematic diagram showing a service transmission in a multicast transmission mode according to the present disclosure;

FIG. 5 is a schematic diagram showing a service transmission in a broadcast transmission mode according to the present disclosure;

FIG. 6A is a schematic flowchart illustrating an optional processing flow of a resource selection method according to an embodiment of the present disclosure;

DESCRIPTION OF EMBODIMENTS

In order to facilitate a more thorough understanding of the features and technical content of the embodiments of the present disclosure, the implementation of the embodiments of the present disclosure will be described in detail below with reference to the figures. The figures are for reference only and are not intended to limit the embodiments of the present disclosure.

Before describing the resource selection method according to the embodiment of the present disclosure in detail, a brief introduction of relevant information involved in the embodiment of the present disclosure will be given first.

For D2D communication, the 3rd Generation Partnership Project (3GPP) defines two transmission modes: Mode 1 (also referred to as Mode A) and Mode 2 (also referred to as Mode B). In Mode 1, a network device allocates transmission resources to a terminal device, and in Mode 2, a terminal device autonomously selects transmission resources.

Figure 1:
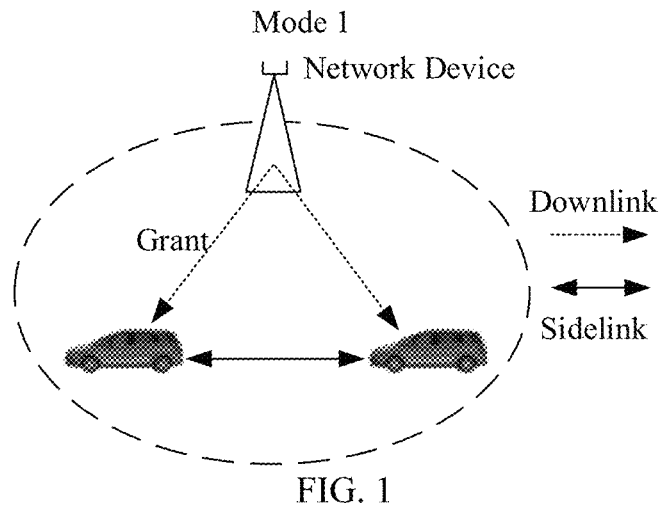
FIG. 1 is a schematic flowchart illustrating a process of selecting a transmission resource in a first mode according to the present disclosure.

For Mode 1, as shown in FIG. 1, the transmission resources of the terminal device are allocated by the network device, and the terminal device transmits data on a sidelink according to the resources allocated by the network device. The network device can allocate a resource for one single transmission or resources for semi-static transmissions for the terminal device. Specifically, the network device can allocate sidelink transmission resources to the terminal device by means of Dynamic Scheduling (DG). Alternatively, the network device can allocate sidelink Configured Grant (CG) transmission resources for the terminal device.

Figure 2:
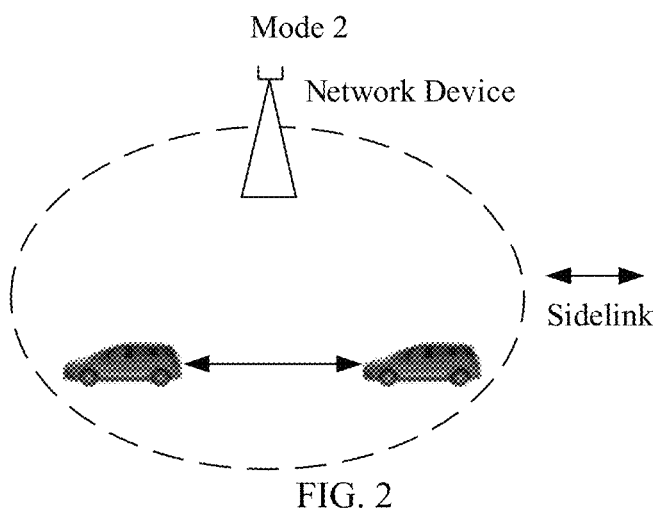
FIG. 2 is a schematic flowchart illustrating a process of selecting a transmission resource in a second mode according to the present disclosure.

For Mode 2, as shown in FIG. 2, the terminal device selects a transmission resource from a resource pool for data transmission.

In LTE-V2X, Transmission Mode 3 and Transmission Mode 4 are introduced. Transmission Mode 3 corresponds to the Mode 1 described above, and Transmission Mode 4 corresponds to the above Mode 2.

Figure 3:
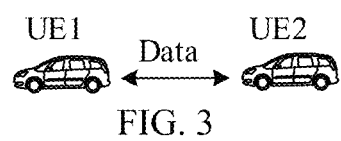
FIG. 3 is a schematic diagram showing a service transmission in a unicast transmission mode according to the present disclosure.

In NR-V2X, broadcast transmission, unicast transmission and multicast transmission are supported. For unicast transmission, as shown in FIG. 3, there is only one terminal device as a receiver, and the unicast transmission is performed between UE1 and UE2. For multicast transmission, all terminal devices in a communication group, or all terminal devices within a certain transmission distance, are receivers. For the multicast transmission, as shown in FIG. 4, UE1, UE2, UE3, and UE4 form a communication group, in which UE1 is the terminal device as a transmitter and configured to transmit data, and UE2, UE3, and UE4 in the group are all terminal devices as receivers and configured to receive data. For broadcast transmission, any terminal device may be a receiver. As shown in FIG. 5, UE1 is the terminal device as a transmitter and configured to transmit data. Other terminal devices around UE1, such as UE2, UE3, UE4, UE5, UE6, and UE7, are terminal devices as receivers and configured to receive data.

Next, a brief description of sidelink CG will be given.

The resource allocation scheme for sidelink CG mainly includes two CG schemes: type-1 configured grant (Type-1 CG) and type-2 configured grant (Type-2 CG).

For Type-1 CG, the network device configures sidelink transmission resources for the terminal device via Radio Resource Control (RRC) signaling. The transmission parameters configured by the RRC signaling may include all transmission resources and transmission parameters, including time domain resource, frequency domain resource, Demodulation Reference Signal (DMRS), Modulation and Coding Scheme (MC S), etc. After receiving the RRC signaling, the terminal device can immediately use the transmission parameters configured by the RRC signaling to perform sidelink transmission on the configured time-frequency resources.

For Type-2 CG, a two-step resource configuration scheme is adopted. First, the transmission resources and transmission parameters are configured via RRC signaling, including period of time-frequency resources, redundancy version, number of retransmissions, number of HARQ processes, etc. The transmission of Type-2 CG is activated by Downlink Control Information (DCI), and other transmission resources and transmission parameters are configured at the same time, including time domain resources, frequency domain resources, MCS, etc. When the terminal device receives the RRC signaling, it cannot immediately use the transmission resources and transmission parameters configured by the RRC signaling for sidelink transmission, but it has to wait until the corresponding DCI is received and other transmission resources and transmission parameters are configured, before performing sidelink transmission. In addition, the network device can also deactivate the configured transmission via DCI. When the terminal device receives the DCI indicating such deactivation, it can no longer use the transmission resources for sidelink transmission.

For the data transmission in the above Mode 1, it is required that the terminal device is located within the coverage of the network device, and there is an RRC connection between the terminal device as the transmitter and the network device, For the data transmission in the above Mode 2, the terminal device autonomously selects transmission resources from a resource pool for sidelink transmission according to a channel detection result. The terminal device performs the transmission resource selection process as follows.

For resource allocation in Mode 2, the higher layer requests the terminal device to determine a set of resources, such that the higher layer can select resources for PSSCH/PSCCH transmission from the set of resources. In order to trigger the resource selection or resource reselection process, in slot n, the higher layer provides the following parameters for the Physical Sidelink Shared Channel (PSSCH)/Physical Sidelink Control Channel (PSCCH) transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of ms.

The following higher layer parameters affect this procedure:

t2min_SelectionWindow: internal parameter $T_{2min}$ is set based on higher layer parameter t2min_SelectionWindow.

SL-ThresRSRP_pi_pj: a Reference Signal Receiving Power (RSRP) threshold for each combination ($p_i$, $p_j$), where $p_i$ represents the value of the priority field in a received Sidelink Control Information (SCI) format 0-1 and $p_j$ represents the value of the priority of the terminal device selecting resources; $p_j=prio_{TX}$.

If the UE uses the PSSCH-RSRP or PSCCH-RSRP measurement, as defined in clause 8.4.2.1.

reservationPeriodAllowed t0_SensingWindow: internal parameter $T_0$ is defined as the number of slots corresponding to t0_SensingWindow ms.

The resource reservation interval, $P_{rsvp\_TX}$ is converted from units of ms to units of logical slots, resulting in $P'_{rsvp\_TX}$.

Notation:

($t_0^{SL}$, $t_1^{SL}$, $t_2^{SL}$, . . . ) denotes the set of slots which can belong to a sidelink resource pool.

The resource selection or resource reselection process is as follows:

1) A candidate single-slot resource for transmission $R_{(x,y)}$ is defined as a set of $L_{subCH}$ contiguous sub-channels with sub-channel x+j in slot $t_y^{SL}$ where j=0, . . . , $L_{subCH}$−1. The terminal device shall assume that any set of $L_{subCH}$ contiguous sub-channels included in the corresponding resource pool within the time interval $[n+T_1, n+T_2]$ correspond to one candidate single-slot resource, where $0 \leq T_1 \leq T_{proc,1}$, where $T_{proc,1}$ represents the maximum allowable processing time;

if $T_{2min}$ is shorter than the remaining packet delay budget (in slots) then $T_{2min} \leq T_2 \leq$ remaining packet budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0})$ where $T_0$ is defined above and $T_{proc,0}$ represents the channel detection result processing delay. The terminal shall monitor slots which can belong to a sidelink resource pool within the sensing window except for those in which its own transmissions occur. The terminal device shall perform the behavior in the following steps based on PSCCH decoded and RSRP measured in these slots.

3) The parameter $Th(p_i)$ is set based on higher layer parameter SL-ThresRSRP_pi_pj for $p_j$ equal to $prio_{TX}$ and $p_i$.

4) The set $S_A$ is initialized to the set of all the candidate single-slot resources.

5) The terminal device shall exclude any candidate single-slot resource $R_{(X,Y)}$ from the set $S_A$ if it meets all the following conditions: $R_{(X,Y)}$ the terminal device has not monitored slot $t_m^{SL}$ in Step 2).

for any periodicity value allowed by the higher layer parameter reservationPeriodAllowed and a hypothetical SCI format 0-1 received in slot $t_m^{SL}$ with "Resource reservation period" field set to that periodicity value and indicating all sub-channels of the resource pool in this slot, condition c in step 6 would be met.

6) The terminal device shall exclude any candidate single-slot resource $R_{(X,Y)}$ from the set $S_A$ if it meets all the following conditions:

a) the terminal device receives an SCI format 0-1 in slot $t_m^{SL}$, and "Resource reservation period" field and "Priority" field in the received SCI format 0-1 indicate the values $P_{rsvp\_RX}$ and $prio_{Rx}$, respectively according to Clause in [6, TS 38.213];

b) the RSRP measurement performed, according to clause 8.4.2.1, is higher than $TH(prio_{RX})$;

c) the SCI format received in slot $t_m^{SL}$ or the same SCI format which, if and only if the "Resource reservation period" field is present in the received SCI format 0-1, is assumed to be received in slot(s) $t_{m+q \times P'_{rsvp\_RX}}^{SL}$ determines the set of resource blocks and slots which overlaps with $R_{x,y+j \times P'_{rsvp\_TX}}$ for q=1, 2, . . . , Q and j=0, 1, . . . , $C_{resel}$-1. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and n'−m$\leq P'_{rsvp\_RX}$, where $t_{n'}^{SL}$=n if slot n belongs to the set $(t_0^{SL}, t_1^{SL}, \ldots, t_{Tmax}^{SL})$, otherwise slot $t_{n'}^{SL}$ is the first slot after slot n belonging to the set $(t_0^{SL}, t_1^{SL}, \ldots, t_{Tmax}^{SL})$; otherwise Q=1.

7) If the number of candidate single-slot resources remaining in the set $S_A$ is smaller than $0.2*M_{total}$, then $TH(p_i)$ is increased by 3 dB and the procedure continues with step 4.

The physical layer of the terminal device reports set $S_A$ to the higher layer.

The Media Access Control (MAC) layer of the terminal device randomly selects one or more resources from $S_A$ for data transmission.

The above Mode 2 is applicable to all scenarios with coverage by a network device and terminal devices in the RRC connected state. However, in Mode 2, since there is no coordination between terminal devices, there may be a case where a plurality of terminal devices selects the same time domain resource. In addition, since a terminal device cannot perform data transmission and data reception operations at the same time in sidelink communication, i.e., there is a half-duplex constraint, the above plurality of terminals cannot receive each other's data. In addition, if a plurality of terminal devices triggers resource selection or resource reselection at the same time, the terminal devices will perform resource selection or resource reselection based on the same channel detection information, which may cause the terminal devices to select the same time-frequency resource or select partially overlapping time-frequency resources, resulting in severe mutual interference.

In order to solve the above problem, the 3GPP has decided to introduce an enhanced resource selection mode, in which one terminal device can assist one or more other terminal devices in resource selection or resource reselection. Specifically, Terminal Device A may transmit a resource set to another Terminal Device B that performs resource selection based on Mode 2. Terminal Device B will take this resource set into consideration when performing resource selection or resource reselection. However, it is not clear how Terminal Device B can specifically perform resource selection or resource reselection.

An embodiment of the present disclosure provides a resource selection method, which can be applied to various communication systems, including for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Network (WLAN), Wireless Fidelity (WiFi), next-generation communication system, or any other communication system, etc.

Generally, traditional communication systems support a limited number of connections and are easy to implement. However, with the development of communication technology, mobile communication systems will support not only traditional communication, but also for example D2D communication, Machine to Machine (M2M) communication, Machine Type Communication (MTC), and Vehicle to Vehicle (V2V) communication, etc. The embodiments of the present disclosure can also be applied to these communication systems.

The network device in the embodiments of the present disclosure may be an ordinary base station (such as a NodeB or eNB or gNB), a New Radio (NR) controller, a centralized unit, an NR base station, a remote radio module, a micro base station, a relay, a distributed unit, a Transmission Reception Point (TRP), a Transmission Point (TP), or any other device. The embodiments of the present disclosure are not limited to any specific technology or any specific device form adopted by the network device. For the purpose of description, in all the embodiments of the present disclosure, the above apparatuses that provide wireless communication functions for terminal devices are collectively referred to as network devices.

In the embodiments of the present disclosure, the terminal device may be any terminal. For example, the terminal device may be a user equipment of machine type communication. In other words, the terminal device can also be referred to as User Equipment (UE), Mobile Station (MS), mobile terminal, terminal, etc., and the terminal device can communicate with one or more core networks via a Radio Access Network (RAN). For example, the terminal device can be a mobile phone (or referred to as a "cellular" phone), a computer with a mobile terminal, etc. For example, the terminal device can also be a portable, pocket-sized, hand-held, computer-built-in, or vehicle-mounted mobile device that can exchange language and/or data with the radio access network. The embodiments of the present disclosure are not limited to any of these examples.

Optionally, the network device and the terminal device can be deployed on land, including indoor or outdoor, handheld or vehicle-mounted, or on water or on airborne aircraft, balloon, or satellite. The embodiments of the present disclosure are not limited to any application scenarios of the network device and the terminal device.

Optionally, the communication between the network device and the terminal device and between the terminal devices can be carried out on a licensed spectrum, an unlicensed spectrum, or both. The communication between the network device and the terminal device and between the terminal devices can be carried out on the frequency spectrum below 7 gigahertz (GHz), the frequency spectrum above 7 GHz, or both. The embodiments of the present disclosure are not limited to any specific spectral resources used between the network device and the terminal device.

The system architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

FIG. 6A shows an optional processing flow of a resource selection method according to an embodiment of the present disclosure. As shown, the method includes the following steps.

At step S101, a first terminal device selects a sidelink transmission resource based on a shared resource set in a resource selection or resource reselection process.

Figure 6B:
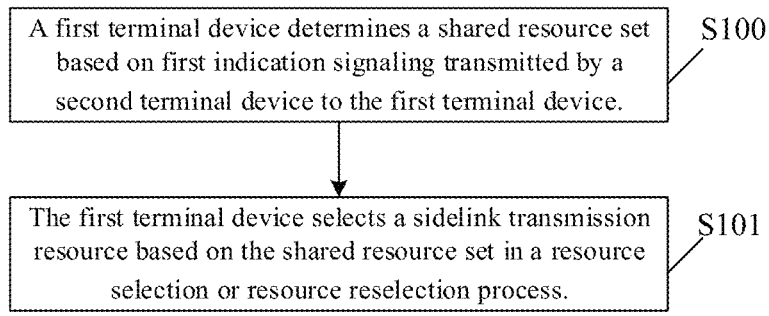
FIG. 6B is a schematic flowchart illustrating an optional processing flow of a resource selection method according to another embodiment of the present disclosure.

In some embodiments, FIG. 6B shows another optional processing flow of a resource selection method according to an embodiment of the present disclosure. As shown, before the step S101 is performed, the method further includes:

At step S100, the first terminal device determines the shared resource set based on first indication signaling transmitted by a second terminal device.

Here, the first indication signaling may be PC5 RRC signaling or physical layer signaling. Optionally, the shared resource set may be represented by Ss, and the first indication signaling may also be referred to as Ss indication signaling.

In some embodiments, the first terminal device may select the sidelink transmission resource from the shared resource set based on a channel detection result. In a specific implementation, if the first terminal device performs the sidelink resource selection or the sidelink resource reselection process in the time slot n, the physical layer of the first terminal device may follow any of the following three schemes to report the resource that can be used for data transmission to a higher layer (e.g., MAC layer).

In Transmission Scheme 1, the first terminal device may determine an intersection of a second resource set and the shared resource set as a first resource set. The second resource set is a set of resources determined by the first terminal device based on the channel detection result. The physical layer of the first terminal device may transmit the first resource set to the higher layer. At least one of resources in the first resource set is used for data transmission.

For example, the second resource set determined by the first terminal device based on the channel detection result may include Resource 1, Resource 2, Resource 3, Resource 4, and Resource 5. The shared resource set transmitted by the second terminal device to the first terminal device may include Resource 1, Resource 2, Resource 3, and Resource 6. Then the first resource set includes Resource 1, Resource 2, and Resource 3. At least one of Resource 1, Resource 2, and Resource 3 is used for data transmission. In this way, the complexity of the process of determining the resource set reported by the physical layer of the terminal device to the higher layer can be reduced.

The specific implementation of the process for determining the second resource set by the first terminal device based on the channel detection result may be the same as that in the related art, and details thereof will be omitted here.

In Transmission Scheme 2, the first terminal device may determine a set of resources, other than resources in the shared resource set, in a first resource selection window as a third resource set. The physical layer of the first terminal device may transmit the third resource set to the higher layer, when a number of resources in the third resource set is smaller than or equal to a first threshold. At least one of the resources in the third resource set is used for data transmission. Here, the first resource selection window is determined based on the time slot where the first terminal device performs the sidelink resource selection or resource reselection process.

For example, the physical layer of the first terminal device first determines the resource selection window [n+T1, n+T2], determines the resources in the resource selection window, and then excludes the resources that do not belong to the shared resource set from the resources in the resource selection window, so as to obtain the third resource set. If the resources in the resource selection window include Resource 1, Resource 2, Resource 3, Resource 4, and Resource 5, and the shared resource set includes Resource 1, Resource 2, and Resource 3, then the third resource set includes Resource 4 and Resource 5.

When the number of resources in the third resource set is smaller than or equal to the first threshold, the physical layer of the first terminal device transmits the third resource set to the higher layer. At least one of the resources in the third resource set is used for data transmission. When the number of resources in the third resource set is greater than the first threshold, the first terminal device further excludes resources from the resources in the resource selection window according to the related art. Optionally, the first threshold may be 0.2 times the total number of candidate single-slot resources, represented by $0.2*M_{total}$. In this way, it is possible to avoid the case where the resource set reported by the physical layer of the terminal device to the higher layer includes too few resources or is an empty set, and reduce the complexity of the process of determining the resource set reported by the physical layer of the terminal device to the higher layer.

In Transmission Scheme 3, the first terminal device may determine an intersection of resources in a first resource selection window and the shared resource set as a fourth resource set, and determine a fifth resource set in the fourth resource set. The physical layer of the first terminal device may transmit the fifth resource set to the higher layer. At least one of resources in the fifth resource set is used for data transmission.

The first terminal device determining the fifth resource set in the fourth resource set may include: the first terminal device determining the fifth resource set in the fourth resource set based on the channel detection result.

For example, the physical layer of the first terminal device first determines the resource selection window [n+T1, n+T2]. If the resources in the resource selection window include Resource 1, Resource 2, Resource 3, Resource 4, and Resource 5, the shared resource set includes Resource 1, Resource 2, and Resource 3, then the fourth resource set includes Resource 1, Resource 2, and Resource 3. The first terminal device selects the resources to be reported to the higher layer from the fourth resource set based on the channel detection result. In this way, it is possible to avoid the case where the resource set reported by the physical layer of the terminal device to the higher layer includes too few resources or is an empty set.

The processing procedure of resource selection or resource reselection by the first terminal device has been described above. In the following, the schemes for triggering the first terminal device to perform resource selection or resource reselection will be described. For the case where the first terminal device selects the sidelink transmission resource from the shared resource set based on the channel detection result, the schemes for triggering the first terminal device to perform resource selection or resource reselection may include any of the following:

In Triggering Scheme 1, the first indication signaling may be irrelevant to a trigger condition for resource selection or resource reselection by the first terminal device. That is, the first indication signaling does not affect the triggering condition for the resource selection or resource reselection of the first terminal device. After the first terminal device receives the first indication signaling, it will not cause additional sidelink resource selection or sidelink resource reselection. In this way, the complexity of the trigger mechanism for the sidelink resource selection or the sidelink resource reselection by the first terminal device can be reduced.

In Triggering Scheme 2, when sidelink transmission resources for retransmission of a transmitted transport block, as indicated in a sidelink grant for the first terminal device, are not completely included in the shared resource set, the first terminal device may be triggered to perform resource selection or resource reselection. For example, if the shared resource set includes Resource 1, Resource 2, Resource 3, Resource 4, and Resource 5, and the sidelink grant configured by the network device for the first terminal device indicates Resource 1, Resource 2, and Resource 6, where Resource 1 and Resource 6 are used for retransmission of the transmitted transport block, that is, the sidelink transmission Resource 6 for retransmission of the transmitted transport block does not belong to the shared resource set, in this scenario the first terminal device is triggered to perform sidelink resource selection or sidelink resource reselection. The transmitted transport block may be an initially transmitted transport block or a retransmitted transport block. In this way, when the resource used for retransmission of the transmitted transport block does not belong to the shared resource set, the first terminal device is triggered to perform resource selection or resource reselection, such that the reliability of data retransmission can be improved.

In a specific implementation, the first terminal device may trigger resource selection or resource reselection within a first time range after receiving the first indication signaling. The first time range may be predefined, e.g., a value defined in a communication standard. Alternatively, the first time range may be configured by a network device, e.g., the network device may transmit to the terminal device configuration information for configuring the first time range. Alternatively, the first time range may be pre-configured, e.g., configured by the first terminal device itself.

Alternatively, when a new data packet arrives in a cache of the first terminal device, the first terminal device may trigger resource selection or resource reselection. In this scenario, the first terminal device may terminate the retransmission of the transmitted transport block. Alternatively, the first terminal device may retransmit the transmitted transport block on an unused sidelink transmission resource among the transmission resources indicated in the sidelink grant. If the network device configures Resource 1, Resource 2, and Resource 3 for the first terminal device, where Resource 3 is unused, then the first terminal device may retransmit the transmitted transport block on Resource 3. If the first terminal device retransmits the transmitted transport block on the unused sidelink transmission resources among the transmission resources indicated in the sidelink grant, the first terminal device may set all values in a reserved period bit field to zeros in sidelink control indication signaling indicating retransmission.

In Triggering Scheme 3, when sidelink transmission resources for new transmission and/or retransmission of a transport block that has not been transmitted, as indicated in a sidelink grant for the first terminal device, are not completely included in the shared resource set, the first terminal device may be triggered to perform resource selection or resource reselection. For example, if the shared resource set includes Resource 1, Resource 2, Resource 3, Resource 4, and Resource 5, and the sidelink grant configured by the network device for the first terminal device indicates Resource 1, Resource 2, and Resource 6, where Resource 1 and Resource 6 are used for new transmission and/or retransmission of a transport block that has not been transmitted, that is, the sidelink transmission Resource 6 for new transmission and/or retransmission of the transport block that has not been transmitted does not belong to the shared resource set, in this scenario the first terminal device is triggered to perform sidelink resource selection or sidelink resource reselection. In a specific implementation, when a new data packet arrives in a cache of the first terminal device, resource selection or resource reselection for the new data packet may be triggered. In this way, the first terminal device is triggered to perform resource selection or resource reselection when the resource used for new transmission or retransmission of the transport block that has not been transmitted does not belong to the shared resource set, such that the reliability of data retransmission can be improved.

In other embodiments, the first terminal device may select the sidelink transmission resource from resources other than the shared resource set. In a specific implementation, if the first terminal device performs the sidelink resource selection or the sidelink resource reselection process in time slot n, the physical layer of the first terminal device may follow any of the following three schemes to report the resource that can be used for data transmission to a higher layer (e.g., MAC layer).

In Transmission Scheme 1, the first terminal device may determine a seventh resource set in a sixth resource set that partially overlaps or completely overlaps resources in the shared resource set. The sixth resource set is a set of resources determined by the first terminal device based on the channel detection result. The physical layer of the first terminal device transmits resources in the sixth resource set, other than the seventh resource set, to the higher layer. At least one of the resources is used for data transmission.

For example, the sixth resource set determined by the first terminal device based on the channel detection result may include Resource 1, Resource 2, Resource 3, Resource 4, and Resource 5. The shared resource set transmitted by the second terminal device to the first terminal device may include Resource 1, Resource 2, Resource 6, and Resource 7. Here, a part of Resource 6 and Resource 3 partially overlap in the time domain, and Resource 7 and Resource 4 partially overlap in the time domain. Then the first terminal device excludes Resource 3 and Resource 4 from the shared resource set, and obtains a resource set including Resource 1, Resource 2, and Resource 5. Then, the physical layer of the first terminal device transmits a resource set including Resource 1, Resource 2, and Resource 5 to the higher layer. In this way, the complexity of the process of determining the resource set reported by the physical layer of the terminal device to the higher layer can be reduced.

The specific implementation of the process for determining the resource set by the first terminal device based on the channel detection result may be the same as that in the related art, and details thereof will be omitted here.

In Transmission Scheme 2, the first terminal device may determine a set of resources in a first resource selection window, other than resources in the first resource selection window that overlap resources in the shared resource set, as an eighth resource set. The physical layer of the first terminal device transmits the eighth resource set to a higher layer, when a number of resources in the eighth resource set is smaller than or equal to a second threshold. At least one of the resources in the eighth resource set is used for data transmission.

For example, the physical layer of the first terminal device first determines the resource selection window [n+T1, n+T2], determines the resources in the resource selection window, and then excludes the resources overlapping the resources in the shared resource set from the resources in the resource selection window, to obtain the eighth resource set. If the resources in the resource selection window include Resource 1, Resource 2, Resource 3, Resource 4, and Resource 5, and the shared resource set includes Resource 6, Resource 7, and Resource 8, where Resource 6 and Resource 1 partially overlap in the time domain, and Resource 7 and Resource 2 completely overlap in the time domain, then the eighth resource set includes Resource 3, Resource 4, and Resource 5.

When the number of resources in the eighth resource set is smaller than or equal to the first threshold, the physical layer of the first terminal device transmits the eighth resource set to the higher layer. At least one of the resources in the third resource set is used for data transmission. When the number of resources in the third resource set is greater than the first threshold, the first terminal device further excludes resources from the resources in the resource selection window according to the related art. Optionally, the first threshold may be 0.2 times the total number of candidate single-slot resources, represented by $0.2*M_{total}$. In this way, it is possible to avoid the case where the resource set reported by the physical layer of the terminal device to the higher layer includes too few resources or is an empty set, and reduce the complexity of the process of determining the resource set reported by the physical layer of the terminal device to the higher layer.

In Transmission Scheme 3, the first terminal device may determine a set of resources, including resources in a first resource selection window, other than resources in the shared resource set, and resources in the first resource selection window that do not overlap the resources in the shared resource set, as a ninth resource set. The first terminal device may determine a tenth resource set in the ninth resource set. At least one of resources in the tenth resource set is used for data transmission.

The first terminal device determining the tenth resource set in the ninth resource set may include: the first terminal device determining the tenth resource set in the ninth resource set based on the channel detection result.

For example, the physical layer of the first terminal device first determines the resource selection window [n+T1, n+T2]. If the resources in the resource selection window include Resource 1, Resource 2, Resource 3, Resource 4, and Resource 5, and the shared resource set includes Resource 1 and Resource 6, where Resource 6 and Resource 3 partially overlap in the time domain and Resource 6 does not overlap Resource 4 and Resource 5, then the ninth resource set includes Resource 2, Resource 4, and Resource 5. The first terminal device selects the resources to be reported to the higher layer from the ninth resource set based on the channel detection result. In this way, it is possible to avoid the case where the resource set reported by the physical layer of the terminal device to the higher layer includes too few resources or is an empty set.

The processing procedure of resource selection or resource reselection by the first terminal device has been described above. In the following, the schemes for triggering the first terminal device to perform resource selection or resource reselection will be described. For the case where the first terminal device selects the sidelink transmission resource from the shared resource set based on the channel detection result, the schemes for triggering the first terminal device to perform resource selection or resource reselection may include any of the following:

In Triggering Scheme 1, the first indication signaling may be irrelevant to a trigger condition for resource selection or resource reselection by the first terminal device. That is, the first indication signaling does not affect the triggering condition for the resource selection or resource reselection of the first terminal device. After the first terminal device receives the first indication signaling, it will not cause additional sidelink resource selection or sidelink resource reselection. In this way, the complexity of the trigger mechanism for the sidelink resource selection or the sidelink resource reselection by the first terminal device can be reduced.

In Triggering Scheme 2, when resources included in the shared resource set overlap all or part of sidelink transmission resources for retransmission of a transmitted transport block as indicated in a sidelink grant for the first terminal device in a time domain, the first terminal device is triggered to perform resource selection or resource reselection. For example, if the shared resource set includes Resource 1, Resource 2, Resource 3, Resource 4, and Resource 5, and the sidelink grant configured by the network device for the first terminal device indicates that the resources for retransmission of the transmitted transport block include Resource 5, Resource 6, and Resource 7, where Resource 5 and Resource 1 partially overlap in the time domain, then the first terminal device is triggered to perform sidelink resource selection or sidelink resource reselection. The transmitted transport block may be an initially transmitted transport block or a retransmitted transport block. In this way, when the resources included in the shared resource set overlap part or all of the sidelink transmission resources for retransmission of the transmitted transport block as indicated in the sidelink grant for the first terminal device in the time domain, the first terminal device can be triggered to perform resource selection or resource reselection, such that the reliability of data retransmission can be improved.

In a specific implementation, the first terminal device may trigger resource selection or resource reselection within a first time range after receiving the first indication signaling. The first time range may be predefined, e.g., a value defined in a communication standard. Alternatively, the first time range may be configured by a network device, e.g., the network device may transmit to the terminal device configuration information for configuring the first time range. Alternatively, the first time range may be pre-configured, e.g., configured by the first terminal device itself.

Alternatively, when a new data packet arrives in a cache of the first terminal device, the first terminal device may trigger resource selection or resource reselection. In this scenario, the first terminal device may terminate the retransmission of the transmitted transport block. Alternatively, the first terminal device may retransmit the transmitted transport block on an unused sidelink transmission resource among the transmission resources indicated in the sidelink grant. If the network device configures Resource 1, Resource 2, and Resource 3 for the first terminal device, where Resource 3 is unused, then the first terminal device may retransmit the transmitted transport block on Resource 3. If the first terminal device retransmits the transmitted transport block on the unused sidelink transmission resources among the transmission resources indicated in the sidelink grant, the first terminal device may set all values in a reserved period bit field to zeros in sidelink control indication signaling indicating retransmission.

In Triggering Scheme 3, when resources included in the shared resource set overlap all or part of sidelink transmission resources for new transmission and/or retransmission of a transport block that has not been transmitted as indicated in a sidelink grant for the first terminal device in a time domain, the first terminal device may be triggered to perform resource selection or resource reselection. For example, if the shared resource set includes Resource 1, Resource 2, Resource 3, Resource 4, and Resource 5, and the sidelink grant configured by the network device for the first terminal device indicates Resource 1, Resource 2, and Resource 6, where Resource 1 and Resource 6 are used for new transmission and/or retransmission of a transport block that has not been transmitted, and Resource 6 for new transmission and/or retransmission of the transport block that has not been transmitted partially overlaps Resource 1 in the shared resource set in the time domain, then the first terminal device is triggered to perform sidelink resource selection or sidelink resource reselection. In a specific implementation, when a new data packet arrives in a cache of the first terminal device, resource selection or resource reselection for the new data packet may be triggered. In this way, the first terminal device is triggered to perform resource selection or resource reselection when the resource used for new transmission or retransmission of the transport block that has not been transmitted does not belong to the shared resource set, such that the reliability of data retransmission can be improved.

In some other embodiments, the first terminal device may select the sidelink transmission resource randomly from the shared resource set.

In Transmission Scheme 1, the physical layer of the first terminal device may transmit the resources in the first resource selection window that belong to the shared resource set to the higher layer. The resources are used for data transmission. For example, the first resource window may include Resource 1, Resource 2, and Resource 3, and the shared resource set may include Resource 1, Resource 2, and Resource 4. Then the physical layer of the first terminal device may transmit a resource set including Resource 1 and Resource 2 to the higher layer. Optionally, when the first resource selection window includes no resource belonging to the shared resource set, the first terminal device may determine a resource set for data transmission based on the channel detection result.

In Transmission Scheme 2, the higher layer of the first terminal device may select the sidelink transmission resource randomly from the shared resource set. For example, if the shared resource set includes Resource 1, Resource 2, and Resource 3, the first terminal device may randomly select at least one resource from Resource 1, Resource 2, and Resource 3 for transmitting to the higher layer. Optionally, if none of the sidelink transmission resources transmitted by the physical layer of the first terminal device to the higher layer meets a set of resources for data transmission based on the channel detection result.

The processing procedure of resource selection or resource reselection by the first terminal device has been described above. In the following, the schemes for triggering the first terminal device to perform resource selection or resource reselection will be described. For the case where the first terminal device selects the sidelink transmission resource from the shared resource set based on the channel detection result, the schemes for triggering the first terminal device to perform resource selection or resource reselection may include any of the following:

In Triggering Scheme 1, the first indication signaling may be irrelevant to a trigger condition for resource selection or resource reselection by the first terminal device. That is, the first indication signaling does not affect the triggering condition for the resource selection or resource reselection of the first terminal device. After the first terminal device receives the first indication signaling, it will not cause additional sidelink resource selection or sidelink resource reselection. In this way, the complexity of the trigger mechanism for the sidelink resource selection or the sidelink resource reselection by the first terminal device can be reduced.

In Triggering Scheme 2, when sidelink transmission resources for retransmission of a transmitted transport block, as indicated in a sidelink grant for the first terminal device, are not completely included in the shared resource set, the first terminal device may be triggered to perform resource selection or resource reselection. For example, if the shared resource set includes Resource 1, Resource 2, Resource 3, Resource 4, and Resource 5, and the sidelink grant configured by the network device for the first terminal device indicates Resource 1, Resource 2, and Resource 6, where Resource 1 and Resource 6 are used for retransmission of the transmitted transport block, that is, the sidelink transmission Resource 6 for retransmission of the transmitted transport block does not belong to the shared resource set, in this scenario the first terminal device is triggered to perform sidelink resource selection or sidelink resource reselection. The transmitted transport block may be an initially transmitted transport block or a retransmitted transport block. In this way, when the resource used for retransmission of the transmitted transport block does not belong to the shared resource set, the first terminal device is triggered to perform resource selection or resource reselection, such that the reliability of data retransmission can be improved.

In a specific implementation, the first terminal device may trigger resource selection or resource reselection within a first time range after receiving the first indication signaling. The first time range may be predefined, e.g., a value defined in a communication standard. Alternatively, the first time range may be configured by a network device, e.g., the network device may transmit to the terminal device configuration information for configuring the first time range. Alternatively, the first time range may be pre-configured, e.g., configured by the first terminal device itself.

Alternatively, when a new data packet arrives in a cache of the first terminal device, the first terminal device may trigger resource selection or resource reselection. In this scenario, the first terminal device may terminate the retransmission of the transmitted transport block. Alternatively, the first terminal device may retransmit the transmitted transport block on an unused sidelink transmission resource among the transmission resources indicated in the sidelink grant. If the network device configures Resource 1, Resource 2, and Resource 3 for the first terminal device, where Resource 3 is unused, then the first terminal device may retransmit the transmitted transport block on Resource 3. If the first terminal device retransmits the transmitted transport block on the unused sidelink transmission resources among the transmission resources indicated in the sidelink grant, the first terminal device may set all values in a reserved period bit field to zeros in sidelink control indication signaling indicating retransmission.

In Triggering Scheme 3, when sidelink transmission resources for new transmission and/or retransmission of a transport block that has not been transmitted, as indicated in a sidelink grant for the first terminal device, are not completely included in the shared resource set, the first terminal device may be triggered to perform resource selection or resource reselection. For example, if the shared resource set includes Resource 1, Resource 2, Resource 3, Resource 4, and Resource 5, and the sidelink grant configured by the network device for the first terminal device indicates Resource 1, Resource 2, and Resource 6, where Resource 1 and Resource 6 are used for new transmission and/or retransmission of a transport block that has not been transmitted, that is, the sidelink transmission Resource 6 for new transmission and/or retransmission of the transport block that has not been transmitted does not belong to the shared resource set, in this scenario the first terminal device is triggered to perform sidelink resource selection or sidelink resource reselection. In a specific implementation, when a new data packet arrives in a cache of the first terminal device, resource selection or resource reselection for the new data packet may be triggered. In this way, the first terminal device is triggered to perform resource selection or resource reselection when the resource used for new transmission or retransmission of the transport block that has not been transmitted does not belong to the shared resource set, such that the reliability of data retransmission can be improved.

In some other embodiments, the first terminal device may select a sidelink transmission resource corresponding to an identifier of the first terminal device from the shared resource set.

In a specific implementation, the shared resource set may be resources indicated in the sidelink grant configured by the network device for the first terminal device. For example, the first terminal device may transmit resource request information to the second terminal device via signaling, the second terminal device may then forward the resource request information to the network device to assist the network device in allocating resources to the first terminal device. The resource request information may include at least one of: a period of the requested resource, a time-domain frequency shift of the requested resource, and the frequency-domain size of the requested resource. The signaling may be PC5 RRC signaling, MAC layer signaling, or physical layer signaling. The shared resource set may include a plurality of sidelink grants, e.g., for a plurality of members in a multicast group. The first terminal device may select a corresponding sidelink grant according to its own identity information. The identity information may be a member identity (ID) of the first terminal device in the multicast group.

Figure 7:
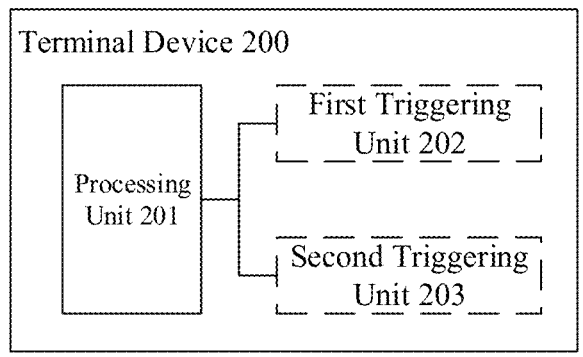
FIG. 7 is a schematic diagram showing a structure of a terminal device according to an embodiment of the present disclosure.

In order to implement the resource selection method described in the embodiment of the present disclosure, an embodiment of the present disclosure provides a first terminal device. The structure of the first terminal device 200, as shown in FIG. 7, includes:

a processing unit 201 configured to select a sidelink transmission resource based on a shared resource set in a resource selection or resource reselection process.

In some embodiments, the shared resource set may be determined based on first indication signaling transmitted by a second terminal device to the first terminal device.

In some embodiments, the processing unit 201 may be configured to select the sidelink transmission resource from the shared resource set based on a channel detection result.

In some embodiments, the processing unit 201 may be configured to select the sidelink transmission resource randomly from the shared resource set.

In some embodiments, when sidelink transmission resources for retransmission of a transmitted transport block, as indicated in a sidelink grant for the first terminal device, are not completely included in the shared resource set, the first terminal device is triggered to perform resource selection or resource reselection.

In some embodiments, when sidelink transmission resources for new transmission and/or retransmission of a transport block that has not been transmitted, as indicated in a sidelink grant for the first terminal device, are not completely included in the shared resource set, the first terminal device is triggered to perform resource selection or resource reselection.

In some embodiments, the processing unit 201 may be configured to select the sidelink transmission resource from resources other than the shared resource set.

In some embodiments, when resources included in the shared resource set overlap all or part of sidelink transmission resources for retransmission of a transmitted transport block as indicated in a sidelink grant for the first terminal device in a time domain, the first terminal device may be triggered to perform resource selection or resource reselection.

In some embodiments, when resources included in the shared resource set overlap all or part of sidelink transmission resources for new transmission and/or retransmission of a transport block that has not been transmitted as indicated in a sidelink grant for the first terminal device in a time domain, the first terminal device may be triggered to perform resource selection or resource reselection.

In some embodiments, the first indication signaling may be irrelevant to a trigger condition for resource selection or resource reselection by the first terminal device.

In some embodiments, the first terminal device may further include: a first triggering unit configured to trigger resource selection or resource reselection within a first time range after receiving the first indication signaling.

In some embodiments, the first time range may be predefined, or the first time range may be configured by a network device, or the first time range may be preconfigured.

In some embodiments, the first terminal device may further include: a second triggering unit configured to trigger resource selection or resource reselection when a new data packet arrives in a cache of the first terminal device.

In some embodiments, the processing unit 201 may be further configured to terminate the retransmission of the transmitted transport block.

In some embodiments, the processing unit 201 may be further configured to retransmit the transmitted transport block on an unused sidelink transmission resource among the transmission resources indicated in the sidelink grant.

In some embodiments, the processing unit 201 may be further configured to set all values in a reserved period bit field to zeros in sidelink control indication signaling indicating retransmission.

In some embodiments, the processing unit 201 may be configured to determine an intersection of a second resource set and the shared resource set as a first resource set. The second resource set is a set of resources determined by the first terminal device based on the channel detection result. A physical layer of the first terminal device may transmit the first resource set to a higher layer, at least one of resources in the first resource set being used for data transmission.

In some embodiments, the processing unit 201 may be configured to determine a set of resources, other than resources in the shared resource set, in a first resource selection window as a third resource set. A physical layer of the first terminal device may transmit the third resource set to a higher layer, when a number of resources in the third resource set is smaller than or equal to a first threshold. At least one of the resources in the third resource set is used for data transmission.

In some embodiments, the processing unit 201 may be configured to determine an intersection of resources in a first resource selection window and the shared resource set as a fourth resource set. The first terminal device may determine a fifth resource set in the fourth resource set. A physical layer of the first terminal device may transmit the fifth resource set to a higher layer. At least one of resources in the fifth resource set is used for data transmission.

In some embodiments, the processing unit 201 may be configured to determine a seventh resource set in a sixth resource set that partially overlaps or completely overlaps resources in the shared resource set. The sixth resource set is a set of resources determined by the first terminal device based on the channel detection result. A physical layer of the first terminal device may transmit resources in the sixth resource set, other than the seventh resource set, to a higher layer. At least one of the resources is used for data transmission.

In some embodiments, the processing unit 201 may be configured to determine a set of resources in a first resource selection window, other than resources in the first resource selection window that overlap resources in the shared resource set, as an eighth resource set. A physical layer of the first terminal device may transmit the eighth resource set to a higher layer, when a number of resources in the eighth resource set is smaller than or equal to a second threshold. At least one of the resources in the eighth resource set is used for data transmission.

In some embodiments, the processing unit 201 may be configured to determine a set of resources, including resources in a first resource selection window, other than resources in the shared resource set, and resources in the first resource selection window that do not overlap the resources in the shared resource set, as a ninth resource set. The first terminal device may determine a tenth resource set in the ninth resource set. At least one of resources in the tenth resource set is used for data transmission.

In some embodiments, a physical layer of the first terminal device may transmit resources belonging to the shared resource set in a first resource selection window to a higher layer. The resources are used for data transmission.

In some embodiments, the processing unit 201 may be configured to determine a set of resources for data transmission based on a channel detection result, when no resource belonging to the shared resource set is included in the first resource selection window.

In some embodiments, a higher layer of the first terminal device may select a sidelink transmission resource randomly from the shared resource set.

In some embodiments, the processing unit 201 may be configured to determine a set of resources for data transmission based on a channel detection result when the sidelink transmission resource does not meet a delay requirement of data to be transmitted.

In some embodiments, the processing unit 201 may be configured to select the sidelink transmission resource corresponding to an identifier of the first terminal device from the shared resource set.

It is to be noted that the transmission resources described in the embodiments of the present disclosure may be sidelink transmission resources.

An embodiment of the present disclosure further provides a terminal device. The terminal device includes a processor and a memory for storing a computer program executable on the processor. The processor is configured to, when executing the computer program, perform the steps of the resource selection method described above performed by the terminal device.

Figure 8:
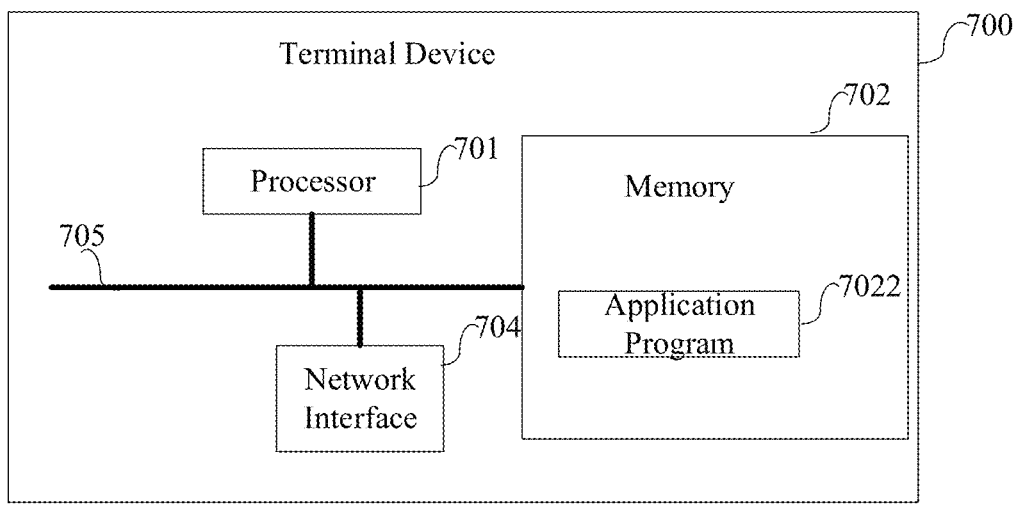
FIG. 8 is a schematic diagram showing a hardware structure of a terminal device according to an embodiment of the present disclosure.

FIG. 8 is a schematic diagram showing a hardware structure of a terminal device according to an embodiment of the present disclosure. The terminal device 700 includes: at least one processor 701, a memory 702, and at least one network interface 704. The components in the terminal device 700 are coupled together via a bus system 705. It can be appreciated that the bus system 705 is configured to implement connection and communication between these components. In addition to a data bus, the bus system 705 also includes a power bus, a control bus, and a status signal bus. However, for the purpose of description, these buses are denoted as the bus system 705 in FIG. 12.

It can be appreciated that the memory 702 may be a volatile memory or a non-volatile memory, and may also include both volatile and non-volatile memories. Here, the non-volatile memory can be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory (e.g., magnetic disk storage or magnetic tape storage), an optical disc, or a Compact Disc Read-Only Memory (CD-ROM). The volatile memory may be a Random Access Memory (RAM), which can be used as an external cache. As non-limiting examples, various forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), or Direct Rambus Random Access Memory (DRRAM). The memory 702 described in the embodiment of the present disclosure is intended to include, but not limited to, any of these and any other suitable types of memories.

The memory 702 in the embodiment of the present disclosure is configured to store various types of data to support the operation of the terminal device 700. Examples of such data include: any computer program operable on the terminal device 700, such as an application program 7022. The program for implementing the method of the embodiment of the present disclosure may be included in the application program 7022.

The method disclosed in any of the embodiments of the present disclosure may be applied to the processor 701 or implemented by the processor 701. The processor 701 may be an integrated circuit chip with signal processing capabilities. In the implementation process, the steps of any of the above methods can be performed by a hardware integrated logic circuit in the processor 701 or instructions in the form of software. The above processor 701 may be a general-purpose processor, a Digital Signal Processor (DSP), or any other programmable logic device, discrete gate or transistor logic device, discrete hardware component, or the like. The processor 701 may implement or execute the methods, steps, and logical block diagrams disclosed in the embodiments of the present disclosure. The general-purpose processor may be a microprocessor or any conventional processor or the like. The steps of the method disclosed in any of the embodiments of the present disclosure may be directly embodied as being executed and completed by a hardware decoding processor, or by a combination of hardware and software modules in the decoding processor. The software modules may be located in a storage medium, which may be provided in the memory 702. The processor 701 reads information from the memory 702 and performs the steps of any of the methods described above in combination with its hardware.

In an exemplary embodiment, the terminal device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic components to implement any of the methods described above.

An embodiment of the present disclosure further provides a storage medium for storing a computer program.

Optionally, the storage medium may be applied in the terminal device in the embodiment of the present disclosure, and the computer program enables a computer to perform the corresponding process in the method according to any of the embodiments of the present disclosure. For brevity, details thereof will be omitted here.

An embodiment of the present disclosure further provides a chip. The chip includes a processor configured to revoke and execute a computer program from a memory, to enable a device provided with the chip to perform the resource selection method described above.

An embodiment of the present disclosure further provides a computer program product. The computer program product includes computer program instructions that cause a computer to perform the resource selection method described above.

An embodiment of the present disclosure further provides a computer program. The computer program causes a computer to perform the resource selection method described above.

The present disclosure has been described with reference to flowcharts and/or block diagrams of methods, devices (systems), and computer program products according to embodiments of the present disclosure. It can be appreciated that each process and/or block in the flowcharts and/or block diagrams, and the combination of processes and/or blocks in the flowcharts and/or block diagrams, can be implemented by computer program instructions. These computer program instructions can be provided to a processor of a general-purpose computer, a special-purpose computer, an embedded processor, or any other programmable data processing device to generate a machine, such that instructions executed by the processor of the computer or any other programmable data processing device can generate means for implementing the functions specified in one or more processes in the flowcharts and/or one or more blocks in the block diagrams.

These computer program instructions can also be stored in a computer-readable memory that can direct a computer or any other programmable data processing device to operate in such a manner that instructions stored in the computer-readable memory can generate an article of manufacture including instruction means for implementing the functions specified in one or more processes in the flowcharts and/or one or more blocks in the block diagrams.

These computer program instructions can also be loaded on a computer or any other programmable data processing device, such that a sequence of operation steps can be executed on the computer or any other programmable device to generate computer-implemented processes, so as to perform the steps for implementing the functions specified in one or more processes in the flowcharts and/or one or more blocks in the block diagrams on the computer or any other programmable device.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

While the preferred embodiments of the present disclosure have been described above they are not intended to limit the scope of the present disclosure. Any modifications, equivalents and improvements that are made without departing from the spirit and principle of the present disclosure are to be encompassed by the scope of the present disclosure.

What is claimed is:

1. A resource selection method, comprising:
   selecting, by a first terminal device, a sidelink transmission resource based on a shared resource set in a resource selection or resource reselection process,
   wherein said selecting, by the first terminal device, the sidelink transmission resource based on the shared resource set comprises:
   selecting, by the first terminal device, the sidelink transmission resource from resources other than the shared resource set,
   wherein when sidelink transmission resources included in the shared resource set overlap all or part of sidelink transmission resources for retransmission of a transmitted transport block as indicated in a sidelink grant for the first terminal device in a time domain, the first terminal device is triggered to perform resource selection or resource reselection.

2. The method according to claim 1, wherein the shared resource set is determined based on first indication signaling transmitted by a second terminal device to the first terminal device.

3. The method according to claim 1, wherein said selecting, by the first terminal device, the sidelink transmission resource based on the shared resource set comprises:
   selecting, by the first terminal device, the sidelink transmission resource from the shared resource set based on a channel detection result.

4. The method according to claim 1, wherein said selecting, by the first terminal device, the sidelink transmission resource based on the shared resource set comprises:
   selecting, by the first terminal device, the sidelink transmission resource randomly from the shared resource set.

5. The method according to claim 3, further comprising:
   determining, by the first terminal device, an intersection of a second resource set and the shared resource set as a first resource set, the second resource set being a set of resources determined by the first terminal device based on the channel detection result, at least one of resources in the first resource set being used for data transmission.

6. The method according to claim 1, further comprising:
   determining, by the first terminal device, a seventh resource set in a sixth resource set that partially overlaps or completely overlaps resources in the shared resource set, the sixth resource set being a set of resources determined by the first terminal device based on the channel detection result; and
   transmitting, by a physical layer of the first terminal device, resources in the sixth resource set, other than the seventh resource set, to a higher layer, at least one of the resources being used for data transmission.

7. The method according to claim 4, further comprising:
   selecting, by a higher layer of the first terminal device, a sidelink transmission resource randomly from the shared resource set.

8. A terminal device, comprising a processor and a memory for storing a computer program executable on the processor, wherein the processor is configured to, when executing the computer program, cause the terminal device to:
   select a sidelink transmission resource based on a shared resource set in a resource selection or resource reselection process,
   wherein said selecting the sidelink transmission resource based on the shared resource set comprises:
   selecting the sidelink transmission resource from resources other than the shared resource set,
   wherein when sidelink transmission resources resources included in the shared resource set overlap all or part of sidelink transmission resources for retransmission of a transmitted transport block as indicated in a sidelink grant for the terminal device in a time domain, the terminal device is triggered to perform resource selection or resource reselection.

9. The terminal device according to claim 8, wherein the shared resource set is determined based on first indication signaling transmitted by a second terminal device to the terminal device.

10. The terminal device according to claim 8, wherein said selecting the sidelink transmission resource based on the shared resource set comprises:
    selecting the sidelink transmission resource from the shared resource set based on a channel detection result.

11. The terminal device according to claim 8, wherein said selecting the sidelink transmission resource based on the shared resource set comprises:
    selecting the sidelink transmission resource randomly from the shared resource set.

12. The terminal device according to claim 10, wherein the processor, when executing the computer program, further causes the terminal device to:
    determine an intersection of a second resource set and the shared resource set as a first resource set, the second resource set being a set of resources determined by the terminal device based on the channel detection result; and
    at least one of resources in the first resource set being used for data transmission.

13. The terminal device according to claim 8, wherein the processor, when executing the computer program, further causes the terminal device to:
    determine a seventh resource set in a sixth resource set that partially overlaps or completely overlaps resources in the shared resource set, the sixth resource set being a set of resources determined by the terminal device based on the channel detection result; and
    transmit, by a physical layer of the terminal device, resources in the sixth resource set, other than the seventh resource set, to a higher layer, at least one of the resources being used for data transmission.

14. The terminal device according to claim 11, wherein the processor, when executing the computer program, further causes the terminal device to:
    selecting, by a higher layer of the terminal device, a sidelink transmission resource randomly from the shared resource set.

15. A chip, comprising: a processor configured to revoke and execute a computer program from a memory, to enable a device provided with the chip to perform a resource selection method comprising:
    selecting, by a first terminal device, a sidelink transmission resource based on a shared resource set in a resource selection or resource reselection process,
    wherein said selecting, by the first terminal device, the sidelink transmission resource based on the shared resource set comprises:
    selecting, by the first terminal device, the sidelink transmission resource from resources other than the shared resource set,
    wherein when sidelink transmission resources resources included in the shared resource set overlap all or part of sidelink transmission resources for retransmission of a transmitted transport block as indicated in a sidelink grant for the terminal device in a time domain, the terminal device is triggered to perform resource selection or resource reselection.

16. A non-transitory storage medium, storing an executable program which, when executed by a processor, implements the resource selection method according to claim 1.

17. The chip according to claim 15, wherein the shared resource set is determined based on first indication signaling transmitted by a second terminal device to the first terminal device.

18. The chip according to claim 15, wherein said selecting, by the first terminal device, the sidelink transmission resource based on the shared resource set comprises:
   selecting, by the first terminal device, the sidelink transmission resource from the shared resource set based on a channel detection result; or
   selecting, by the first terminal device, the sidelink transmission resource randomly from the shared resource set.

19. The chip according to claim 18, further comprising:
   determining, by the first terminal device, an intersection of a second resource set and the shared resource set as a first resource set, the second resource set being a set of resources determined by the first terminal device based on the channel detection result, at least one of resources in the first resource set being used for data transmission.

20. The chip according to claim 15, further comprising:
   determining, by the first terminal device, a seventh resource set in a sixth resource set that partially overlaps or completely overlaps resources in the shared resource set, the sixth resource set being a set of resources determined by the first terminal device based on the channel detection result; and
   transmitting, by a physical layer of the first terminal device, resources in the sixth resource set, other than the seventh resource set, to a higher layer, at least one of the resources being used for data transmission.

* * * * *